United States Patent
Griffin et al.

(10) Patent No.: US 9,983,382 B2
(45) Date of Patent: May 29, 2018

(54) ACTIVE APERTURE PARTITIONING FOR AN IMAGING SYSTEM

(71) Applicant: The Boeing Company, Chicago, IL (US)

(72) Inventors: Steven F. Griffin, Kihei, HI (US); Brandoch Calef, Kihei, HI (US)

(73) Assignee: The Boeing Company, Chicago, IL (US)

(*) Notice: Subject to any disclaimer, the term of this patent is extended or adjusted under 35 U.S.C. 154(b) by 406 days.

(21) Appl. No.: 14/594,227

(22) Filed: Jan. 12, 2015

(65) Prior Publication Data
US 2016/0330373 A1 Nov. 10, 2016

(51) Int. Cl.
G02B 26/06 (2006.01)
G02B 7/182 (2006.01)
G02B 27/00 (2006.01)

(52) U.S. Cl.
CPC .......... G02B 7/1827 (2013.01); G02B 26/06 (2013.01); G02B 27/0068 (2013.01)

(58) Field of Classification Search
CPC ............. H04N 5/23264; H04N 5/217; H04N 5/23212; H04N 5/2353; G02B 26/06; G02B 27/0068; G02B 7/1827
See application file for complete search history.

(56) References Cited

U.S. PATENT DOCUMENTS

| | | | | |
|---|---|---|---|---|
| 6,183,419 B1* | 2/2001 | Wildes | ............... | G01S 7/52046 600/447 |
| 7,631,839 B1* | 12/2009 | Duncan | ................. | B64G 1/105 244/158.1 |
| 2003/0132382 A1* | 7/2003 | Sogard | ................... | G01N 23/04 250/311 |
| 2004/0172106 A1* | 9/2004 | Imaizumi | ............... | A61F 9/008 607/89 |
| 2005/0224695 A1* | 10/2005 | Mushika | ............... | G02B 26/06 250/208.2 |
| 2005/0264870 A1* | 12/2005 | Kim | ........................ | G02B 3/00 359/298 |
| 2005/0275928 A1* | 12/2005 | Kim | ..................... | G02B 3/0081 359/291 |
| 2009/0051772 A1* | 2/2009 | Rhoads | .................. | G02B 7/005 348/187 |

(Continued)

OTHER PUBLICATIONS

Calef, B. et al., "Improving large-telescope speckle imaging via aperture partitioning," 2008 Advanced Maui Optical and Space Surveillance Technologies Conference, Maui, HI (Sep. 16-19, 2008).

(Continued)

*Primary Examiner* — Hung Lam
(74) *Attorney, Agent, or Firm* — Thompson Hine LLP

(57) ABSTRACT

An aperture partitioning element for an imaging system is disclosed. The aperture partitioning element includes a plurality of segments each including a reflective surface and a body. The plurality of segments are each independently moveable in at least one of an x-axis, a y-axis, and a z-axis of the aperture partitioning element. The aperture partitioning element also includes at least one positioner received within the body of a corresponding segment. The at least one positioner is actuated to move the corresponding segment in at least one of the x-axis, the y-axis, and the z-axis.

20 Claims, 7 Drawing Sheets

(56) References Cited

U.S. PATENT DOCUMENTS

2010/0295984 A1* 11/2010 Neidrich ............... G02B 23/02
  348/340
2014/0218749 A1* 8/2014 Trail ...................... G02B 23/06
  356/510

OTHER PUBLICATIONS

Kornilov, V. et al., "Combined MASS-DIMM instrument for atmospheric turbulence studies," Mon. Not. R. Astron. Soc. 000, 1-11 (Sep. 2007).
Tuthill, P.G., "The unlikely rise of masking interferometry: leading the way with 19th century technology" (Feb. 12, 2013).

* cited by examiner

ACTIVE APERTURE PARTITIONING FOR AN IMAGING SYSTEM

STATEMENT REGARDING FEDERALLY SPONSORED RESEARCH OR DEVELOPMENT

This invention was made with Government support under the Department of Defense, awarded by IROSS. The government has certain rights in this invention.

FIELD

The disclosed system relates to an active aperture partitioning element for an imaging system and, more particularly, to an active aperture partitioning element including a plurality of segments that are independently moveable.

BACKGROUND

Images may be collected through the atmosphere through an imaging system such as, for example, a terrestrial telescope. However, the images may become distorted or blurred by temperature-induced variations in the refractive index along the line of sight. There are a variety of approaches currently available that may be used to improve blurring of the images. For example, speckle imaging techniques may be used to correct the blurring. Speckle imaging techniques are commonly known and used in astronomy to correct the blurring of images. Some types of speckle imaging techniques include, for example, the bispectrum technique and aperture masking interferometry. In particular, the bispectrum technique may implement aperture partitioning. Aperture partitioning may involve partitioning the pupil into different subregions. Each subregion of the pupil may be tilted in a different direction, thereby causing reflected images to be focused on different parts of a focal plane.

Partitioning the pupil may reduce the degree of redundant baselines within the pupil. However, the ideal number of subregions within the pupil may depend on the aperture diameter, which is usually fixed. However, the ideal number of subregions within the pupil may also depend on atmospheric coherence length, which is a dynamic parameter constantly changing based on atmospheric conditions. The atmospheric coherence length may also be referred to as the Fried parameter, which is designated as $r_0$. Those skilled in the art will readily appreciate that there is a continuing need for an improved approach for reducing or correcting the blurring of images in light of the changing atmospheric conditions.

SUMMARY

In one aspect, an aperture partitioning element for an imaging system is disclosed. The aperture partitioning element includes a plurality of segments each including a reflective surface and a body. The plurality of segments are each independently moveable in at least one of an x-axis, a y-axis, and a z-axis of the aperture partitioning element. The aperture partitioning element also includes at least one positioner received within the body of a corresponding segment. At least one positioner is actuated to move the corresponding segment in at least one of the x-axis, the y-axis, and the z-axis.

In another aspect, a method of operating an aperture partitioning element of an imaging system is disclosed. The method includes providing a plurality of segments each including a reflective surface and a body. The plurality of segments are each independently moveable in at least one of an x-axis, a y-axis, and a z-axis of the aperture partitioning element. The method further includes moving a selected segment by a positioner received within the body of the at least one segment. The positioner is actuated to move the segment in at least one of the x-axis, the y-axis, and the z-axis.

Other objects and advantages of the disclosed method and system will be apparent from the following description, the accompanying drawings and the appended claims.

DETAILED DESCRIPTION

Figure 1:
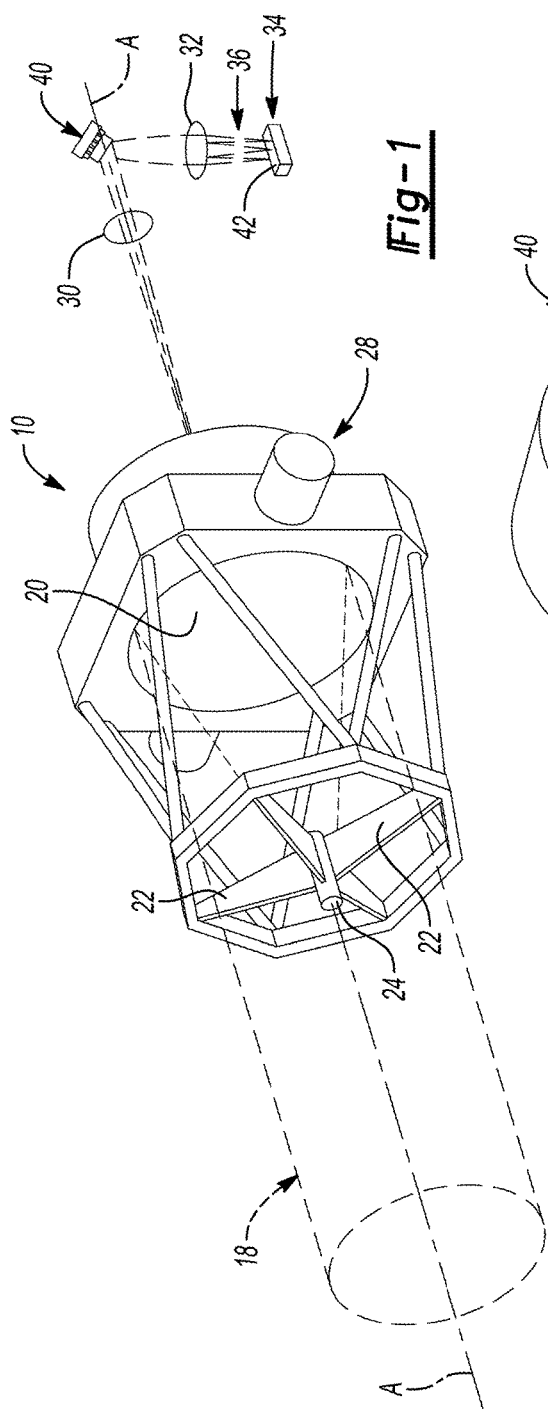
FIG. 1 is an illustration of the imaging system including an active aperture partitioning element.

FIG. 1 illustrates the disclosed imaging system 10 according to an aspect of the disclosure. The imaging system 10 may be any type of device for observing remote objects by collecting electromagnetic radiation, such as visible light. For example, in one embodiment, the imaging system 10 may be a terrestrial telescope. The imaging system 10 may include a primary mirror 20, spider supports 22, a secondary mirror 24, and a sensor package 28. The spider supports 22 may be used the position the secondary mirror 24 along a longitudinal axis A-A of the imaging system 10. For purposes of ease and simplicity of illustration, a first lens 30, a second lens 32, an image plane 34, and an active aperture partitioning element 40 are shown outside of the sensor package 28 in FIG. 1. However, it is to be understood that first lens 30, the second lens 32, the image plane 34, and the aperture partitioning element 40 are actually contained within the sensor package 28 of the imaging system 10.

As seen in FIG. 1, a light ray 18 may enter the imaging system 10, and is reflected onto the primary mirror 20 of the imaging system 10. The light ray 18 reflects from the primary mirror 20 to the secondary mirror 24. The light ray 18 then reflects from the secondary mirror 24 towards the first lens 30. The light ray 18 may pass through the first lens 30 and is reimaged onto the aperture partitioning element 40. The aperture partitioning element 40 may be at a pupil position within the imaging system 10. As explained in greater detail below, the light ray 18 may be re-focused into separate, distinct images 36 by the aperture partitioning element 40. For example, in the embodiment as shown in FIG. 1, the aperture partitioning element 40 may be used to focus the light ray 18 into three separate images 36. The images 36 may be focused onto an imaging surface 42 of the image plane 34 through the second lens 32.

Figure 2:
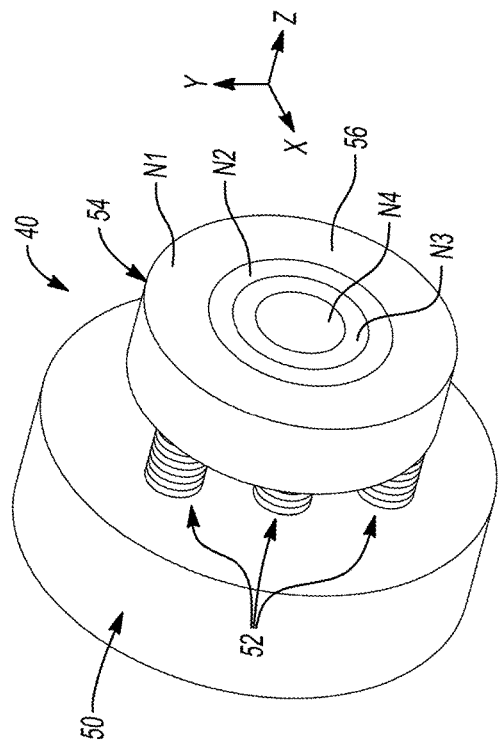
FIG. 2 is a perspective view of the aperture partitioning element shown in FIG. 1, where a plurality of annular segments are substantially aligned with one another.

FIG. 2 is a perspective view of the aperture partitioning element 40 shown in FIG. 1. The aperture partitioning element 40 includes a base 50, a plurality of positioners 52, and a plurality of substantially annular segments 54. The segments 54 may each include a reflective surface or mirrored surface 56 used to reflect images onto the imaging surface 42 of the image plane 34 seen in FIG. 1. In the embodiment as shown in FIG. 2, the segments 54 may be a series of substantially concentric annular segments. For example, four segments N1, N2, N3, N4 are shown in FIG. 2. However, it is to be understood that this illustration is merely exemplary in nature, and the aperture partitioning element 40 may include any number of multiple segments as well. Moreover, although FIG. 2 illustrates substantially circular segments, it is to be understood that the segments could also be substantially oval shaped as well.

In the embodiment as shown in FIG. 2, an outermost segment is labeled as N1, an outer middle segment is labelled as N2, an inner middle segment as labelled is N3, and an inner segment is labelled as N4. As explained in greater detail below, each segment N1, N2, N3, N4 may be controlled by the positioners 52 to change tip, tilt, and displacement. In particular, the segments N1, N2, N3, N4 may be controlled such that an image reflected onto the mirrored surface 56 may be broken up or partitioned into separate images that are reflected onto the imaging surface 42 of the image plane 34 (FIG. 1). In the embodiment as shown in FIG. 2, the segments N1, N2, N3, N4 are substantially aligned with one another in order to create a substantially flush mirrored surface 56. Thus, the segments N1, N2, N3, N4 act as a continuous flat mirror. In other words, only one image may be reflected onto the imaging surface 42 of the image plane 34.

Figure 3:
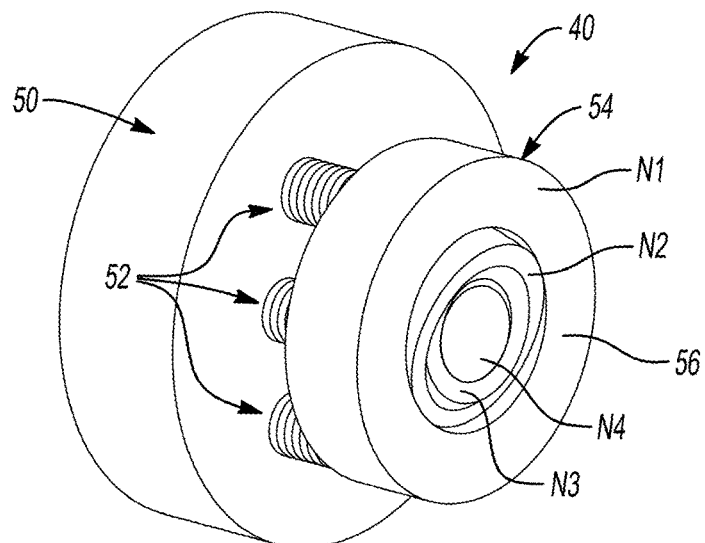
FIG. 3 is an exaggerated perspective view of the aperture partitioning element shown in FIG. 1, where the outer three annular segments are tilted into different positions.

Turning now to FIG. 3, the segments N1, N2, N3 have each been actuated into different positions. Those skilled in the art will readily appreciate that the tilt of the segments N1, N2, N3 shown in FIG. 3 are exaggerated in order to more clearly show the tilting. In the arrangement as shown in FIG. 3, four distinct images may each be reflected onto the imaging surface 42 of the image plane 34 (FIG. 1). However, it is to be understood that in another approach two or more of the segments N1, N2, N3, N4 may be phased or aligned with one another to effectively act as a single subaperture. For example, the outermost segment N1 and the outer middle segment N2 may be aligned with one another to effectively act as a single subaperture. Thus, the mirrored surface 56 of the aperture partitioning element 40 would only reflect three distinct images may each be reflected onto the imaging surface 42 of the image plane 34 (FIG. 1).

Figure 4:
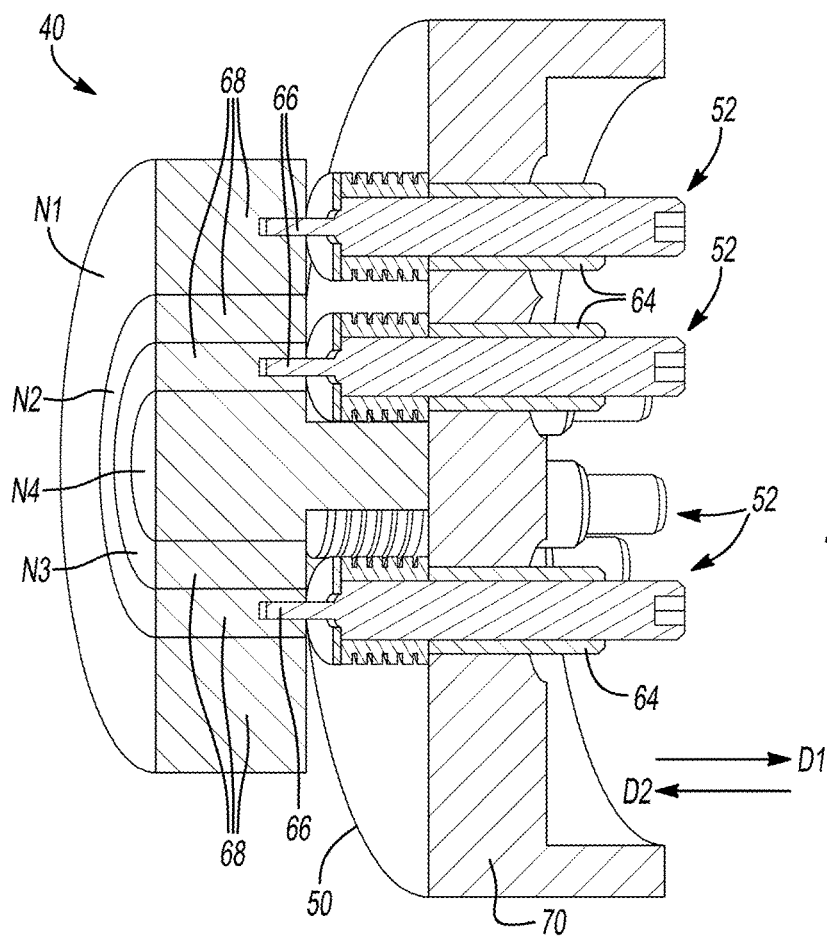
FIG. 4 is a cross-sectional view of the aperture partitioning element.

FIG. 4 is a partially cross-sectioned view of the aperture partitioning element 40. Referring to both FIGS. 2 and 4, the positioners 52 may be used to control tip (i.e., rotation about an x-axis of the aperture partitioning element 40), tilt (i.e., rotation about the y-axis of the aperture partitioning element 40), and/or piston displacement (i.e., displacement in the z-axis of the aperture partitioning element 40) of the outer three segments N1, N2, and N3. The x-axis, y-axis, and z-axis of the aperture partitioning element 40 are each illustrated in FIG. 2. Turning back to FIG. 4, the positioners 52 may each be received within a corresponding sleeve or cylinder 64. Each positioner 52 may include an end portion or tip 66, which is received within a body 68 of one of the segments N1, N2, N3. Each cylinder 64 extends through a body 70 of the base 50. It is to be understood that the three outer segments N1, N2, N3 are movable, but the inner segment N4 may be fixedly or rigidly attached to the base 50 of the aperture partitioning element 40. In other words, the three outer segments N1, N2, N3 may move, but the innermost segment N4 remains stationary. However, this embodiment is merely exemplary in nature, and the disclosure should not be limited to a stationary inner segment.

Figure 5:
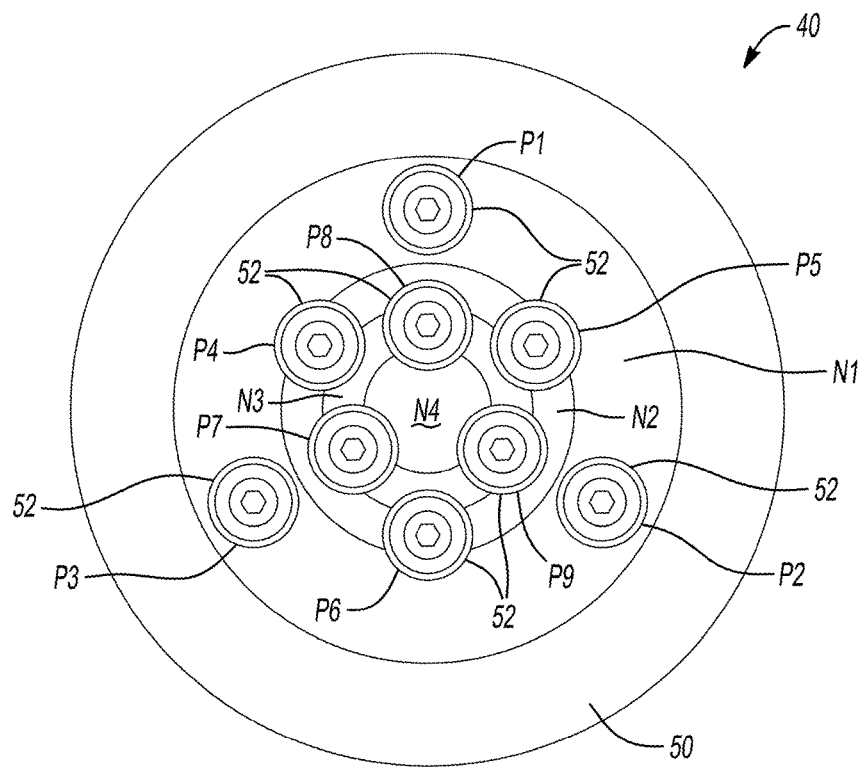
FIG. 5 is a rear view of the aperture partitioning element, where a control module is in communication with a plurality of positioners that are part of the aperture partitioning element.
Figure 5:
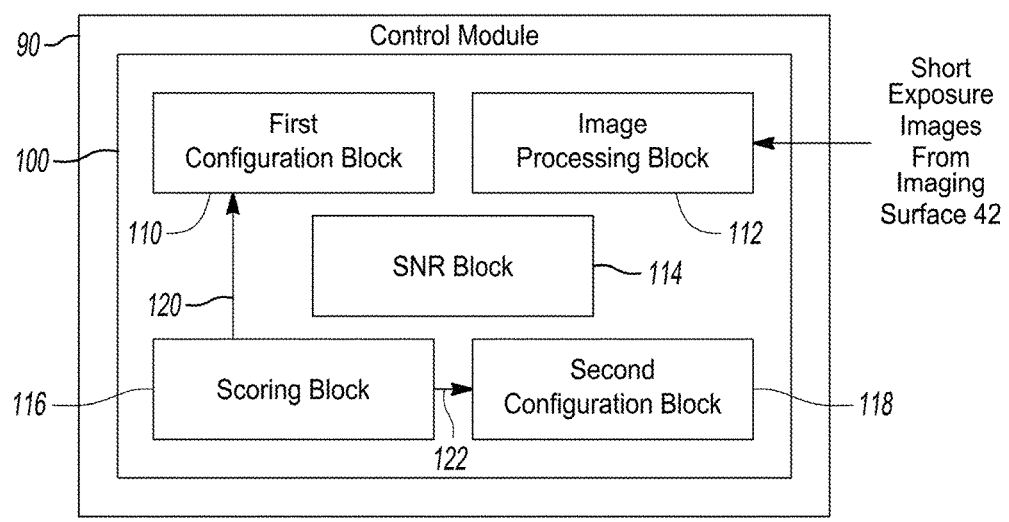

Continuing to refer to FIG. 4, at least one of the tip, tilt, and piston displacement of the outer three segments N1, N2, and N3 may be controlled by actuating a corresponding positioner 52 in either a first linear direction D1 or in a second, opposing linear direction D2 within the cylinder 64. FIG. 5 is a rear view of the aperture partitioning element 40. In the exemplary embodiment as shown in FIG. 5, the aperture partitioning element 40 includes a total of nine positioners 52, which are labelled as P1-P9. As seen in FIG. 5, the positioners P1, P2, and P3 may be used to control the tip, tilt, or piston displacement of the outermost segment N1. The positioners P4, P5, and P6 may be used to control the position of the tip, tilt, or piston displacement of the outer middle segment N2. Finally, the positioners P7, P8, and P9 may be used to control the position of the tip, tilt, or piston displacement of the inner middle segment N3. Although nine positioners P1-P9 are illustrated in FIG. 5, it is to be understood that this illustration is merely exemplary in nature, and that any number of positioners 52 may be used as well.

In one non-limiting embodiment, the positioners 52 may be piezoceramic actuators. Those skilled in the art will appreciate that piezoceramic actuators utilize the piezoelectric effect, thereby converting electrical energy directly into linear motion. Specifically, as described in greater detail below, voltage may be applied to the piezoceramic actuators in order to control the tip, tilt, and piston displacement of the outer three segments N1, N2, and N3. Although piezoceramic actuators are discussed, it is to be understood that the positioners 52 may be actuated by other devices as well such as, but not limited to, relatively small closed loop voice coils or a stepper motor.

A control module 90 may be in communication with each of the positioners P1-P9 though a set of wires (the wires are not illustrated in FIG. 5). Each wire is connected to the control module 90 as well as one of the positioners P1-P9. The control module 90 may also be an image processing module that collects images 36 that are focused onto the imaging surface 42 of the image plane 34 (FIG. 1). The control module 90 may refer to, or be part of, an application specific integrated circuit (ASIC), an electronic circuit, a combinational logic circuit, a field programmable gate array (FPGA), a processor (shared, dedicated, or group) comprising hardware or software that executes code, or a combination of some or all of the above, such as in a system-on-chip. Those skilled in the art will readily appreciate that while a single control module 90 is illustrated in the figures and described, the control module 90 may also include multiple control modules as well.

The control module 90 includes control logic or circuitry for determining a specific amount of voltage to be applied to each of the positioners P1-P9 to control the x-axis, the y-axis, and/or the z-axis position of the positioners P1-P9 of the aperture partitioning element 40. In particular, the control module 90 may apply the specific amount of voltage to a specific positioner P1-P9 through a corresponding one of the wires (not illustrated in FIG. 5). The control module 90 may apply voltage to one or more positioners P1-P9 in order to position one or more of the three outer segments N1, N2, and N3 into a specific configuration of the aperture partitioning element 40.

The specific configuration of the aperture partitioning element 40 may be defined by the positions of the segments N1, N2, N3 relative to one another. For example, the aperture partitioning element 40 shown in FIG. 3 shows the segments N1, N2, N3 being actuated into different positions. Specifically, referring to FIGS. 3-5, the outermost segment N1 has been actuated into a first position, where the control module 90 (FIG. 5) has applied the specific amount of voltage to the wires corresponding to the positioners P1-P3. Similarly, the outer middle segment N2 has been actuated into a second position, where the control module 90 (FIG. 5) has applied the specific amount of voltage to the wires corresponding to the positioners P4-P6. Likewise, the inner middle segment N3 has been actuated into a third position, where the control module 90 (FIG. 5) applies voltage to the wires corresponding to the positioners P7-P9.

Figure 7:
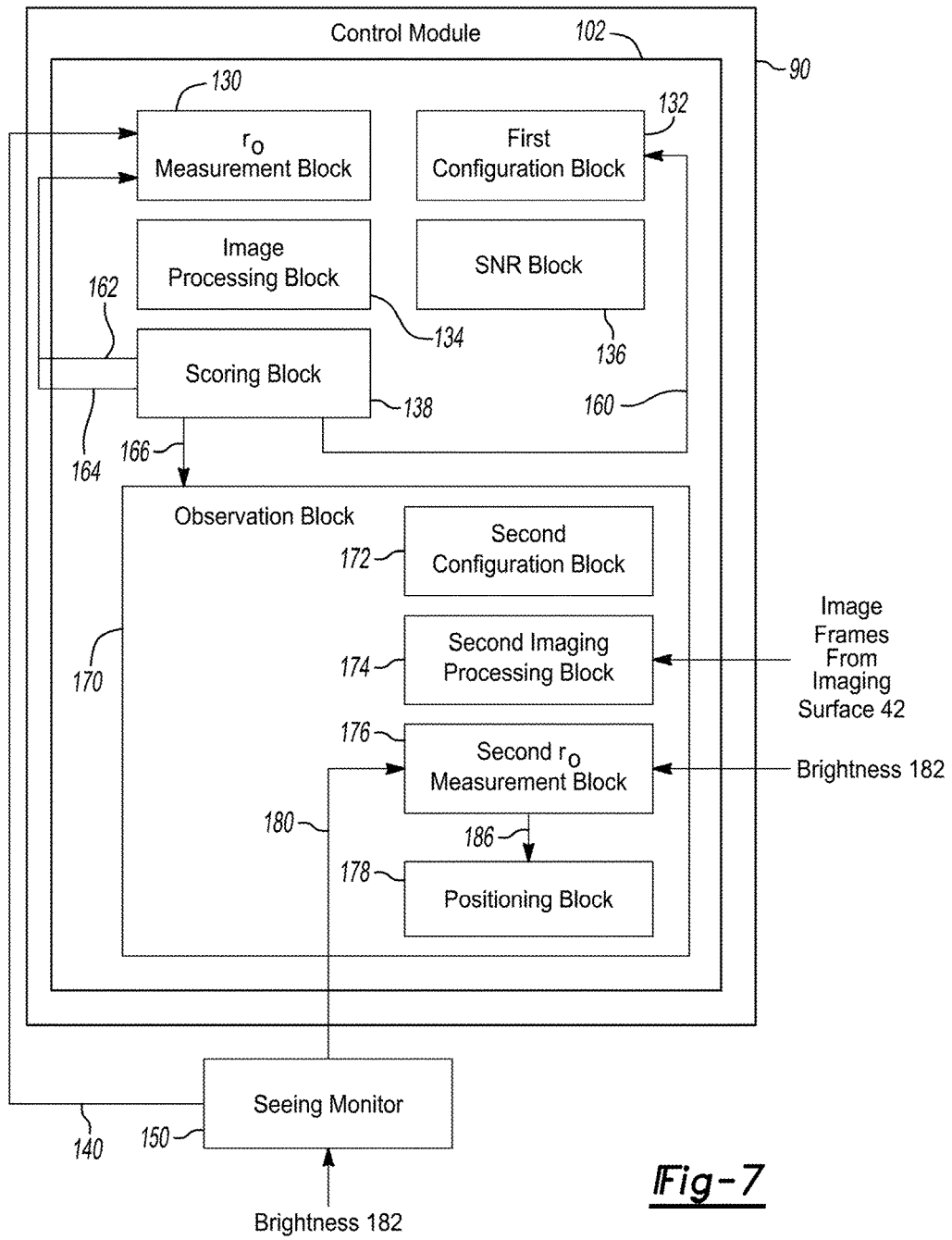
FIG. 7 is an alternative embodiment of the control module shown in FIG. 5.

Referring to FIG. 5, the control module 90 includes a first module 100 for determining the specific amount of voltage to be applied to each of the positioners P1-P9 in order to place the aperture partitioning element 40 into the specific configuration based on an algorithm that does not require a look-up table. As explained in greater detail below, in an alternative embodiment as shown in FIG. 7 the control module 90 includes a second module 102. The second module 102 determines the specific amount of voltage to be applied to each of the positioners P1-P9 based on an algorithm that generates a look-up table.

Turning back to FIG. 5, the first module 100 may include a first configuration block 110, an image processing block 112, a signal-to-noise ratio (SNR) block 114, a scoring block 116, and a second configuration block 118. As explained in greater detail below, the first module 100 first gathers short-exposure images collected by the aperture partitioning element 40 for a plurality of reasonable configurations S of the aperture positioning element 40. The plurality of reasonable configurations S may be defined as the total number of possible positions that the segments of the aperture positioning element 40 may be positioned at, where only segments positioned immediately adjacent to one another together may be phased together. For example, adjacent segments N2 and N3 of the aperture positioning element 40 may be phased together to count as one reasonable configuration of the aperture positioning element 40. Adjacent segments N1, N2, and N3 of the aperture partitioning element 40 may be phased together to count as another reasonable configuration of the aperture positioning element 40. Moreover, all four segments N1, N2, N3, N4 of the aperture positioning element 40 could be phased together as well to count as yet another reasonable configuration of the aperture positioning element 40. However, segments N1 and N4 of the aperture partitioning element 40 may not be phased together to count as a reasonable configuration. In the exemplary embodiment as shown in FIGS. 2-5, the aperture partitioning element 40 has four segments N1, N2, N3, N4, thereby resulting in eight reasonable configurations S (i.e., S=8). The segments of the aperture partitioning element 40 may be phased together to effectively act as a single subaperture (i.e., segments N1 and N2 may be phased together to act as a single subaperture).

The first configuration block 110 may position the aperture partitioning element 40 into one of the reasonable configurations S. Specifically, the first configuration block 110 may send a control signal indicative of specific amounts of voltage that needs to be applied to each of the positioners P1-P9 in order to place the segments N1, N2, N3 of the aperture partitioning element 40 into one of the reasonable configurations S. Once the aperture partitioning element 40 is positioned in one of the reasonable configurations S, short-exposure images are then collected by the imaging system 10 (FIG. 1) for a specific amount of time. For example, in one embodiment the short-exposure images may be collected for a period of about one second. In particular, as seen in FIG. 1, the short-exposure images may be focused onto an imaging surface 42 of the image plane 34 through the second lens 32. Turning back to FIG. 5, the short-exposure images may be sent to the image processing block 112 of the first module 100 for processing.

Once the image processing block 112 has collected the short-exposure images for the specific amount of time, then the imaging processing block 112 sends the short-exposure images to the SNR block 114. The SNR block 114 may calculate the SNR of the speckle transfer function (STF) of all of the short-exposure images collected during the specific amount of time. Specifically, the SNR block 114 may first calculate the STF of each short-exposure image by first determining the Fourier transform of a single short-exposure image, and then squaring the Fourier transform of the single short-exposure image, which is expressed by Equation 1 as:

$$STF_i = |\text{Fourier transform}\{\text{image frame } i\}|^2 \quad \text{Equation 1}$$

where the term i represents an index between one and the total number of short-exposure images, and $STF_i$ represents the speckle transfer function of the single short-exposure image i. Once the STF of each single short-expose image is determined, then the SNR block 114 may determine the SNR of all of the short-exposure images collected during the specific amount of time. The SNR may be expressed in Equation 2 as:

$$SNR = \text{mean}_i(STF_i)/\text{standard deviation}_i(STF_i) \quad \text{Equation 2}$$

where the SNR determined by Equation 2 is a function of spatial frequency, and may be expressed in units of cycles per meter. The SNR determined by Equation 2 may be used as a scoring factor to determine the quality of the short-exposure images. For example, an SNR higher than 1:1 indicates more signal than noise, and is also indicative of higher quality images.

Once the SNR is determined by the SNR block 114, the SNR is sent to the scoring block 116. The scoring block 116 first determines if the SNR of all of the reasonable configurations S of the aperture partitioning element 40 have been calculated. If all of the reasonable configurations S of the aperture partitioning element 40 have not been calculated, then the scoring block 116 may send a signal 120 back to the first configuration block 110. The first configuration block 110 may then send a control signal indicative of specific amounts of voltage that need to be applied to each of the positioners P1-P9 in order to place the segments N1, N2, N3 of the aperture partitioning element 40 into another one of the reasonable configurations S.

If all of the reasonable configurations S of the aperture partitioning element 40 have been calculated, then the scoring block 116 may select the reasonable configuration yielding the highest SNR out of all of the reasonable configurations S. The scoring block 116 also determines if the reasonable configuration yielding the highest SNR is above or exceeds a predetermined threshold. For example, in one embodiment, the predetermined threshold may be an SNR of 2:1. Once the reasonable configuration yielding the highest SNR is determined, then the scoring block 116 sends a signal 122 to the second configuration block 118. The signal 122 indicates the selected reasonable configuration yielding the highest SNR. In response to receiving the signal 122, the second configuration block 118 may then position the aperture partitioning element 40 into the reasonable configuration yielding the highest SNR. Once the aperture partitioning element 40 is positioned into the reasonable configuration yielding the highest SNR, images are then collected by the imaging system 10 (FIG. 1) for a predetermined time (e.g., about one minute).

Figure 6:
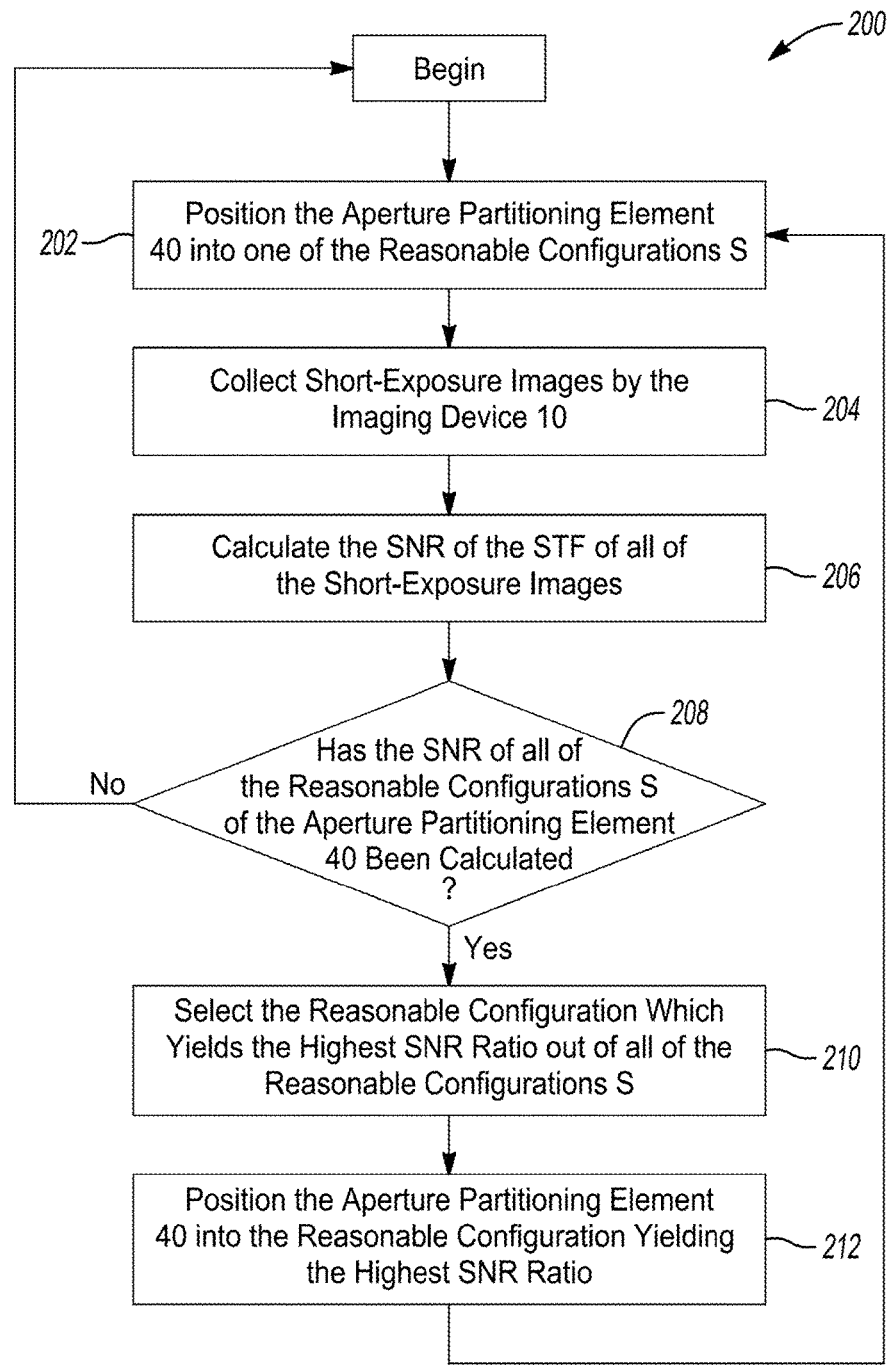
FIG. 6 is a process flow diagram illustrating an approach for positioning the segments of the aperture partitioning element.

FIG. 6 is a process flow diagram illustrating an exemplary method 200 for placing the aperture partitioning element 40 into the reasonable configuration yielding the highest SNR. Referring generally to FIGS. 1-6, method 200 may begin at block 202, where the first configuration block 110 of the first module 100 of the control module 90 positions the aperture partitioning element 40 into one of the reasonable configurations S. Method 200 may then proceed to block 204.

In block 204, short-exposure images are collected by the imaging system 10 (FIG. 1) for a specific amount of time (e.g., about one second). The short-term images may be sent to the image processing block 112 of the first module 100. Once the image processing block 112 has collected the short-exposure images, then the imaging processing block 112 sends the short-exposure images to the SNR block 114. Method 200 may then proceed to block 206.

In block 206, the SNR block 114 may calculate the SNR of the STF of all of the short-exposure images. Specifically, the SNR block 114 may first calculate the STF of each short-exposure image using Equation 1, which is described above. Once the STF of each single short-expose image is determined, then the SNR block 114 may determine the SNR of all of the short-exposure images using Equation 2, which is also described above. Once the SNR is determined by the SNR block 114, the SNR is sent to the scoring block 116. Method 200 may then proceed to block 208.

In block 208, the scoring block 116 first determines if the SNR of all of the reasonable configurations S of the aperture partitioning element 40 have been calculated. If all of the reasonable configurations S of the aperture partitioning element 40 have not been calculated, then method 200 returns to block 202. If all of the reasonable configurations S of the aperture partitioning element 40 have been calculated, then method 200 may proceed to block 210.

In block 210, the scoring block 116 selects the reasonable configuration yielding the highest SNR out of all of the reasonable configurations S. Once the reasonable configurations S yielding the highest SNR is determined, then the scoring block 116 sends the signal 122 to the second configuration block 118. Method 200 may then proceed to block 212.

In block 212, the second configuration block 118 may then position the aperture partitioning element 40 into the reasonable configuration yielding the highest SNR. Once the aperture partitioning element 40 is positioned into the reasonable configuration yielding the highest SNR, images are then collected by the imaging system 10 (FIG. 1) for a predetermined time (e.g., about one minute). Method 200 may then proceed back to block 202.

FIG. 7 is an alternative embodiment of the control module 90. In the embodiment as shown in FIG. 7, the second module 102 determines the specific amount of voltage to be applied to each of the positioners P1-P9 of the aperture partitioning element 40 (FIG. 5) based on an algorithm that generates a look-up table. The second module 102 may include a Fried parameter ($r_0$) measurement block 130, a first configuration block 132, an imaging processing block 134, an SNR block 136, a scoring block 138, and an observation block 170.

The $r_0$ measurement block 130 of the second module 102 may receive as input a signal 140 indicating a Fried parameter $r_0$ (also referred to as the atmospheric coherence length) of the atmosphere currently observed by the imaging system 10 (FIG. 1). The signal 140 may be generated by a seeing monitor 150 in signal communication with the $r_0$ measurement block 130. The seeing monitor 150 may be aligned or positioned to view the same atmospheric pathway as the imaging system 10 (FIG. 1). In one embodiment, the seeing monitor 150 may be a wavefront sensor. In response to receiving the signal 140, the $r_0$ measurement block 130 may then direct or point the aperture partitioning element 40 and the imaging system 10 (FIG. 1) towards a first object of known brightness. The first object of known brightness may be any observable object where the brightness is already known such as, for example, a star.

Once the imaging system 10 (FIG. 1) is pointed towards the first object of known brightness, the first configuration block 132 of the second module 102 may position the aperture partitioning element 40 into a selected one of the reasonable configurations S. Specifically, referring to both FIGS. 5 and 7, the first configuration block 132 may send a control signal indicative of specific amounts of voltage that need to be applied to each of the positioners P1-P9 in order to place the segments N1, N2, N3 of the aperture partitioning element 40 into one of the reasonable configurations S. Once the aperture partitioning element 40 is positioned in one of the reasonable configurations S, short-exposure images of the first object of known brightness are then collected by the imaging system 10 (FIG. 1) for a specific amount of time. The short-term images may be sent to the image processing block 134 of the second module 102 for processing.

Once the image processing block 134 has collected the short-exposure images, then the imaging processing block 134 sends the short-exposure images to the SNR block 136 of the second module 102. The SNR block 136 may calculate the SNR of the speckle transfer function (STF) of all of the short-exposure images collected during the specific amount of time. Specifically, the SNR block 136 may first calculate the STF of each short-exposure image by first determining the Fourier transform of a single short-exposure image, and then squaring the Fourier transform of the single short-exposure image, which is expressed by Equation 1 as described above. Once the STF of each single short-expose image is determined, then the SNR block 136 may determine the SNR of all of the short-exposure images. The SNR may be expressed in Equation 2, which is also described above.

Once the SNR is determined by the SNR block 136, the SNR is sent to the scoring block 138. The scoring block 138 may select the reasonable configuration yielding the highest SNR out of all of the reasonable configurations S. The reasonable configuration yielding the highest SNR out of all the reasonable configurations S is also noted with respect to the first object of known brightness as well as the Fried parameter $r_0$ measured by the seeing monitor 150.

The scoring block 138 also determines if the reasonable configuration yielding the highest SNR exceeds a predetermined threshold. For example, in one embodiment the predetermined threshold may be an SNR of 2:1. Once the scoring block 138 determines the reasonable configuration yielding the highest SNR, then the scoring block 138 determines if the SNR of all of the reasonable configurations S of the aperture partitioning element 40 have been calculated. If all of the reasonable configurations S of the aperture partitioning element 40 have not been calculated, then the scoring block 138 may send a signal 160 back to the first configuration block 132. The first configuration block 132 may then send a control signal indicative of specific amounts of voltage that need to be applied to each of the positioners P1-P9 in order to place the segments N1, N2, N3 of the aperture partitioning element 40 into another one of the reasonable configurations S.

The scoring block 138 may also determine if a sufficient number of objects of known brightness have been observed. For example, in one embodiment, the imaging system 10 (FIG. 1) may need to look at five unique objects in order to generate the look-up table. The look-up table is described in greater detail below. If a sufficient number of objects of known brightness have not been observed, then the scoring block 138 sends a signal 162 back to the $r_0$ measurement block 130. The $r_0$ measurement block 130 may then direct or point the imaging system 10 (FIG. 1) towards another object of known brightness.

The scoring block 138 may further determine if a sufficient number of samples of the Fried parameter $r_0$ have been collected. For example, in one embodiment, the imaging system 10 (FIG. 1) may need to collect five unique samples of the Fried parameter $r_0$ in order to generate the look-up table. If a sufficient number of samples of the Fried parameter $r_0$ have not been collected, then the scoring block 138 sends a signal 164 back to the $r_0$ measurement block 130. The $r_0$ measurement block 130 may then monitor the seeing monitor 150 for the signal 140 indicating the current Fried Parameter.

If the scoring block 138 determines that the SNR of all of the reasonable configurations S of the aperture partitioning element 40 have been calculated, the sufficient number of objects of known brightness have been observed, and the sufficient number of samples of the Fried parameter $r_0$ have been collected, then the scoring block 138 may generate a look-up table. The lookup table may indicate the reasonable configuration yielding the highest SNR based on the multiple Fried parameters $r_0$ as well as the multiple objects of various brightness (i.e., stars of various brightness) observed by the imaging system 10. The scoring block 138 may then send a signal 166 to the observation block 170. The signal 166 includes the look-up table as determined by the scoring block 138.

The observation block 170 may be used to observe a second object of known brightness (e.g., a star). Specifically, the observation block 170 may include a second configuration block 172, a second imaging processing block 174, a second $r_0$ measurement block 176, and a positioning block 178. The imaging system 10 (FIG. 1) is first pointed towards the second object of known brightness. Once the imaging system 10 is pointed at the second object of known brightness, the second configuration block 172 may then position the aperture partitioning element 40 into a selected one of the reasonable configurations S. Once the aperture partitioning element 40 is positioned in one of the reasonable configurations S, image frames of the second object of known brightness are then collected by the imaging surface 42 of the imaging system 10 (FIG. 1). The image frames may be sent to the second image processing block 174.

The second $r_0$ measurement block 176 may receive as input the image frames collected by the second imaging processing block 174. The second $r_0$ measurement block 176 may further receive as input a signal 180 indicating the Fried parameter $r_0$ of the atmosphere as the second object of known brightness is observed. The signal 180 may be generated by the seeing monitor 150 in signal communication with the second $r_0$ measurement block 176. The second $r_0$ measurement block 176 also receives as input the brightness 182 of the second object of known brightness. The brightness 182 may be a user-generated input (i.e., a user indicates the brightness of a specific star currently being observed).

The second $r_0$ measurement block 176 sends a signal 186 to the positioning block 178 indicating the brightness of the second object, the Fried parameter $r_0$ of the atmosphere, and the look-up table as determined by the scoring block 138. The positioning block 178 may then determine the reasonable configuration yielding the highest SNR based on the current Fried parameter as well as the brightness of the second object using the look-up table. Then positioning block 178 may also may send a control signal indicative of specific amounts of voltage that need to be applied to each of the positioners P1-P9 in order to place the segments N1, N2, N3 of the aperture partitioning element 40 into the reasonable configuration yielding the highest SNR based on the current Fried parameter as well as the brightness of the second object.

Figure 8A:
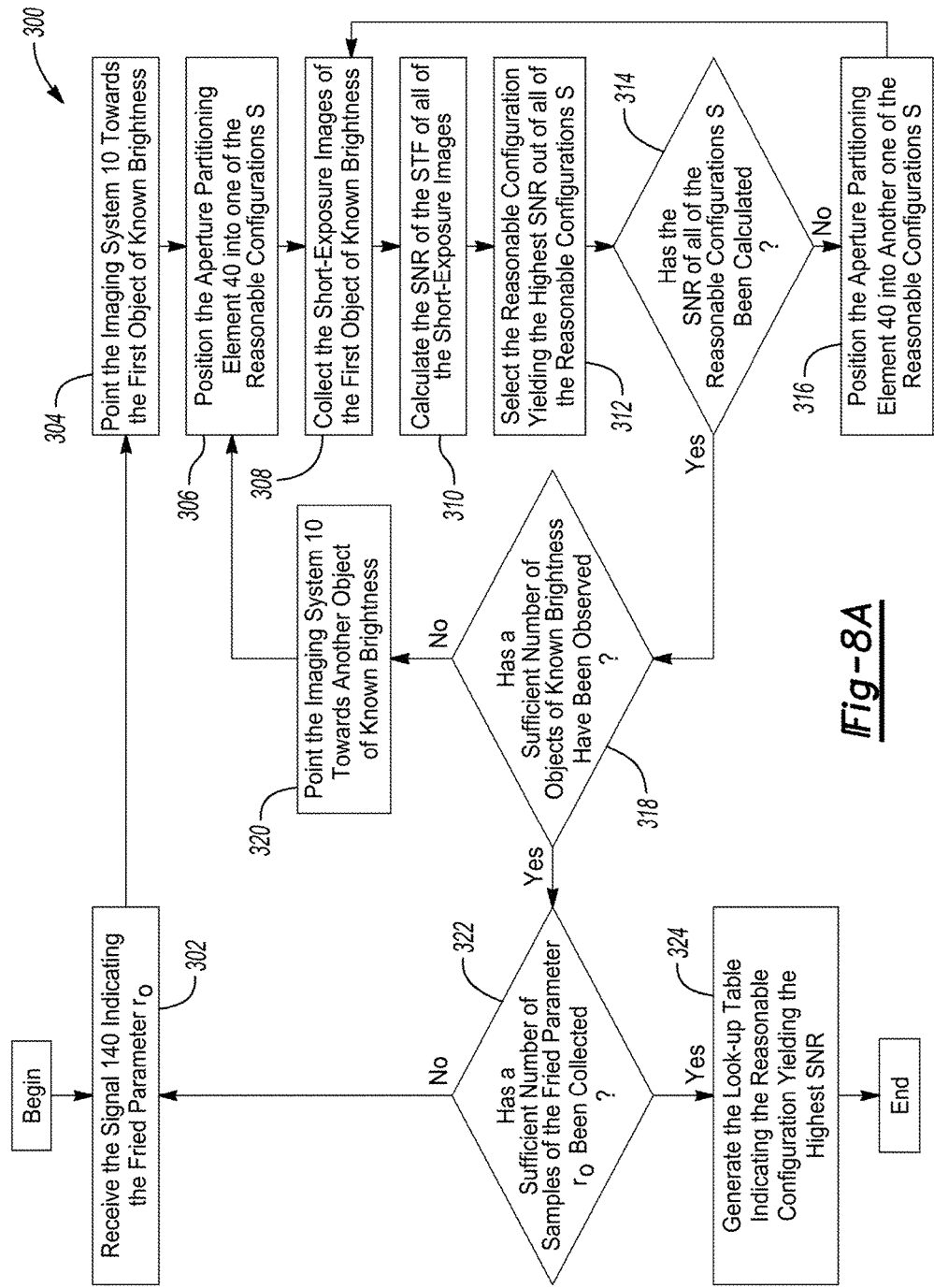
FIGS. 8A and 8B are process flow diagrams illustrating another approach for an approach for positioning the segments of the aperture partitioning element.
Figure 8B:
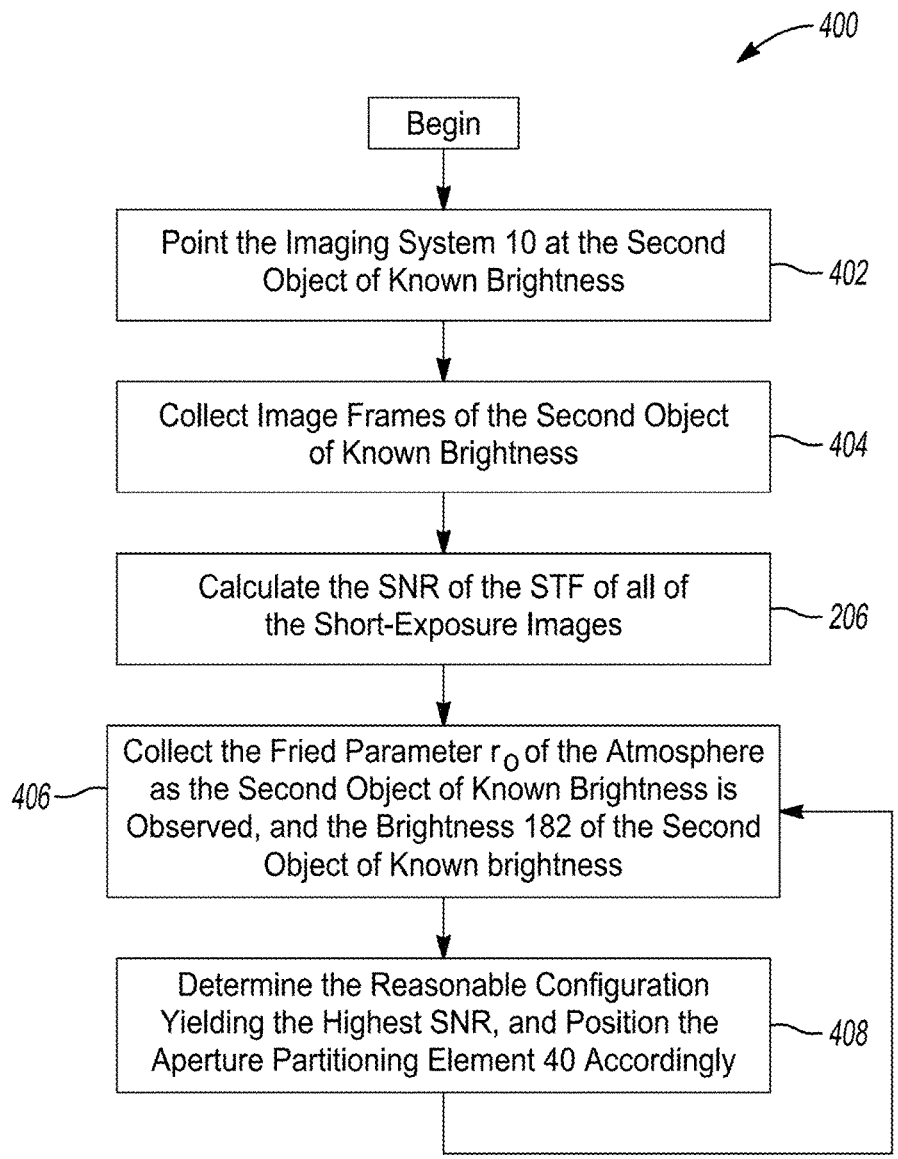

FIGS. 8A and 8B illustrate an exemplary method for placing the aperture partitioning element 40 into the reasonable configuration yielding the highest SNR using the look-up table. Specifically, FIG. 8A illustrates a method 300 of generating the look-up table indicating the reasonable configuration yielding the highest SNR based on the current Fried parameter as well as the brightness of the first object. FIG. 8B illustrates a method 400 of observing the second object of known brightness. Referring generally to FIGS. 1, 5, 7, and 8A, method 300 may begin at block 302. In block 302, the $r_0$ measurement block 130 receives as input the signal 140 indicating the Fried parameter $r_0$. The signal 140 may be generated by the seeing monitor 150. Method 300 may then proceed to block 304.

In block 304, the imaging system 10 (FIG. 1) is pointed towards the first object of known brightness. Method 300 may proceed to block 306.

In block 306, the first configuration block 132 of the second module 102 positions the aperture partitioning element 40 into one of the reasonable configurations S. Method 300 may then proceed to block 308.

In block 308, the short-exposure images of the first object of known brightness are collected by the imaging system 10 (FIG. 1) for a specific amount of time (e.g., about one second). The short-term images may be sent to the image processing block 134 of the second module 102 for processing. Method 300 may then proceed to block 310.

In block 310, the SNR block 136 of the second module 102 calculates the SNR of the STF of all of the short-exposure images. Specifically, the SNR block 136 may first calculate the STF of each short-exposure image. Once the STF of each single short-expose image is determined, then the SNR block 136 may determine the SNR of all of the short-exposure images. Once the SNR is determined by the SNR block 136, the SNR is sent to the scoring block 138. Method 300 may then proceed to block 312.

In block 312, the scoring block 138 of the second module 102 selects the reasonable configuration yielding the highest SNR out of all of the reasonable configurations S with respect to the first object of known brightness as well as the Fried parameter $r_0$ measured by the seeing monitor 150 in block 302. Method 300 may then proceed to block 314.

In block 314, the scoring block 138 determines if the SNR of all of the reasonable configurations S of the aperture partitioning element 40 have been calculated. If all of the reasonable configurations S of the aperture partitioning element 40 have not been calculated, then method 300 proceeds to block 316.

In block 316, the scoring block 138 sends the signal 160 back to the first configuration block 132. The first configuration block 132 may then send a control signal indicative of specific amounts of voltage that need to be applied to each of the positioners P1-P9 in order to place the segments N1, N2, N3 of the aperture partitioning element 40 into another one of the reasonable configurations S. Method 300 may then proceed back to block 308.

Referring back to block 314, if all of the reasonable configurations S of the aperture partitioning element 40 have not been calculated, then method 300 proceeds to block 318. In block 318, the scoring block 138 may also determine if a sufficient number of objects of known brightness have been observed. If a sufficient number of objects of known brightness have not been observed, then method 300 proceeds to block 320.

In block 320, the scoring block 138 sends the signal 162 back to the $r_0$ measurement block 130. The $r_0$ measurement block 130 may then direct or point the imaging system 10 (FIG. 1) towards another object of known brightness. Method 300 may then proceed back to block 306.

Referring back to block 318, if a sufficient number of objects have been observed, then method 300 may proceed to block 322. In block 322, the scoring block 138 may determine if a sufficient number of samples of the Fried parameter $r_0$ have been collected. If a sufficient number of samples of the Fried parameter $r_0$ have not been collected, then method 300 may return back to block 302. However, if a sufficient number of samples of the Fried parameter $r_0$ have been collected, then method 300 may proceed to block 324.

In block 324, the scoring block 138 generates the look-up table indicating the reasonable configuration yielding the highest SNR based on the multiple measured Fried parameters $r_0$ as well multiple objects of varying brightness. Method 300 may then terminate. Now the imaging system 10 and the aperture partitioning element 40 may be operated by the control module 90 to observe the second object of known brightness based on the look-up table generated by the scoring block 138. This operation of the imaging system 10 and the aperture partitioning element 40 is described in method 400 shown in FIG. 8B.

Turning now to FIGS. 1, 5, 7, and 8B, method 400 may begin at block 402. In block 402, the imaging system 10 (FIG. 1) is pointed towards the second object of known brightness. Once the imaging system 10 is pointed at the second object of known brightness, the second configuration block 172 may then position the aperture partitioning element 40 into a selected one of the reasonable configurations S. Method 400 may then proceed to block 404.

In block 404, image frames of the second object of known brightness are then collected by the imaging system 10. The image frames may be sent to the second image processing block 174. Method 400 may then proceed to block 406.

In block 406, the second $r_0$ measurement block 176 may receive as input the image frames collected by the second imaging processing block 174, the signal 180 indicating the Fried parameter $r_0$ of the atmosphere as the second object of known brightness is observed, and the brightness 182 of the second object of known brightness. Method 400 may then proceed to block 408. The measurement block 176 sends the signal 186 to the positioning block 178. The signal 186 indicates the brightness of the second object, the Fried parameter $r_0$ of the atmosphere, and the look-up table as determined by the scoring block 138 in block 324 of method 300 (seen in FIG. 8A). Method 400 may then proceed to block 408.

In block 408, the positioning block 178 may determine the reasonable configuration yielding the highest SNR based on the current Fried parameter $r_0$ as well as the brightness of the second object using the look-up table. Then positioning block 178 may then send a control signal indicative of specific amounts of voltage that need to be applied to each of the positioners P1-P9 (FIG. 5) in order to place the segments N1, N2, N3 of the aperture partitioning element 40 into the reasonable configuration yielding the highest SNR. Method 400 may then proceed back to block 406, where the imaging system 10 continues to monitor the Fried parameter of the current atmosphere as well as the brightness of the object currently being observed.

Referring generally to the figures, the disclosed aperture partitioning element may be used to correct the blurring in images using a dynamic approach. Specifically, because the disclosed aperture partitioning element includes segments independently movable from one another, the segments may be adjusted in order to adapt to the changing atmospheric conditions (i.e., the atmospheric coherence length).

While the forms of apparatus and methods herein described constitute preferred aspects of this disclosure, it is to be understood that the disclosure is not limited to these precise forms of apparatus and methods, and the changes may be made therein without departing from the scope of the disclosure.

What is claimed is:

1. An aperture partitioning element for an imaging system, comprising:
    a plurality of segments each including a reflective surface and a body, wherein the plurality of segments are each independently moveable in at least one of an x-axis, a y-axis, and a z-axis of the aperture partitioning element, and wherein the plurality of segments are arranged as a series of substantially annular segments that are concentric to one another;
    at least one positioner received within the body of a corresponding segment, wherein the at least one positioner is actuated to move the corresponding segment in at least one of the x-axis, the y-axis, and the z-axis; and
    a control module in communication with the at least one positioner, the control module including an image processing block, wherein short-exposure images collected by the imaging system for a specific amount of time are sent to the imaging processing block,
    wherein the control module calculates a speckle transfer function (STF) of a selected one of the short-exposure images sent to the imaging processing block based on:

$$STF_i = |\text{Fourier transform}\{\text{image frame } i\}|^2$$

wherein i represents an index between one and a total number of the short-exposure images, and $STF_i$ represents the speckle transfer function of the selected one of the short-exposure images.

2. The aperture partitioning element of claim 1, wherein the control module determines a specific amount of voltage applied to the at least one positioner for actuation.

3. The aperture partitioning element of claim 1, wherein the control module determines a signal-to-noise ratio (SNR) of all of the short-exposure images sent to the imaging processing block based on:

$$SNR = \text{mean}_i(STF_i)/\text{standard deviation}_i(STF_i).$$

4. The aperture partitioning element of claim 3, wherein the control module determines the SNR of a plurality of reasonable configurations of the aperture partitioning element.

5. The aperture partitioning element of claim 4, wherein the control module selects a reasonable configuration yielding the highest SNR, and wherein the aperture partitioning element is positioned into the reasonable configuration yielding the highest SNR.

6. The aperture partitioning element of claim 1, wherein the control module is in signal communication with a seeing monitor, and wherein the seeing monitor sends a signal indicative of a Fried parameter of atmosphere observed by the imaging system.

7. The aperture partitioning element of claim 6, wherein the control module determines a signal-to-noise ratio (SNR) of all of the short-exposure images sent to the imaging processing block based on:

$$SNR = mean_i(STF_i)/standard\ deviation_i(STF_i).$$

8. The aperture partitioning element of claim 7, wherein the control module determines the SNR of a plurality of reasonable configurations of the aperture partitioning element.

9. The aperture partitioning element of claim 8, wherein the control module generates a look-up table that indicates a reasonable configuration yielding a highest SNR based on multiple measured Fried parameters and multiple objects of various brightness.

10. The aperture partitioning element of claim 9, wherein the aperture partitioning element is operated by the control module to observe a second object of known brightness based on the look-up table.

11. The aperture partitioning element of claim 1, wherein at least two of the plurality of segments of the aperture partitioning element are phased together to effectively act as a single subaperture.

12. The aperture partitioning element of claim 1, wherein the aperture partitioning element includes an innermost segment that is stationary.

13. A method of operating an aperture partitioning element of an imaging system, the method comprising:

providing a plurality of segments each including a reflective surface and a body, wherein the plurality of segments are each independently moveable in at least one of an x-axis, a y-axis, and a z-axis of the aperture partitioning element, wherein the plurality of segments are arranged as a series of substantially annular segments that are concentric to one another; and moving a selected segment by a positioner received within the body of the selected segment, wherein the positioner is actuated to move the selected segment in at least one of the x-axis, the y-axis, and the z-axis, wherein the positioner is in communication with a control module, the control module including an image processing block, wherein short-exposure images collected by the imaging system for a specific amount of time are sent to the imaging processing block, and wherein the control module calculates a speckle transfer function (STF) of a selected one of the short-exposure images sent to the imaging processing block based on:

$$STF_i = |Fourier\ transform\{image\ frame\ i\}|^2$$

wherein i represents an index between one and a total number of the short-exposure images, and $STF_i$ represents the speckle transfer function of the selected one of the short-exposure images.

14. The method of claim 13, wherein the control module determines a specific amount of voltage applied to the positioner for actuation.

15. The method of claim 13, wherein the aperture partitioning element includes an innermost segment that is stationary.

16. An aperture partitioning element for an imaging system, comprising:

a plurality of segments each including a reflective surface and a body, wherein the plurality of segments are each independently moveable in at least one of an x-axis, a y-axis, and a z-axis of the aperture partitioning element;

at least one positioner received within the body of a corresponding segment, wherein the at least one positioner is actuated to move the corresponding segment in at least one of the x-axis, the y-axis, and the z-axis; and a control module in communication with the at least one positioner and including an image processing block, wherein short-exposure images collected by the imaging system for a specific amount of time are sent to the imaging processing block, and wherein the control module calculates a speckle transfer function (STF) of a selected one of the short-exposure images sent to the imaging processing block based on:

$$STF_i = |Fourier\ transform\{image\ frame\ i\}|^2$$

wherein i represents an index between one and a total number of the short-exposure images, and $STF_i$ represents the speckle transfer function of the selected one of the short-exposure images.

17. The aperture partitioning element of claim 16, wherein the control module determines a signal-to-noise ratio (SNR) of all of the short-exposure images sent to the imaging processing block based on:

$$SNR = mean_i(STF_i)/standard\ deviation_i(STF_i).$$

18. The aperture partitioning element of claim 17, wherein the control module determines the SNR of a plurality of reasonable configurations of the aperture partitioning element.

19. The aperture partitioning element of claim 18, wherein the control module selects a reasonable configuration yielding the highest SNR, and wherein the aperture partitioning element is positioned into the reasonable configuration yielding the highest SNR.

20. The aperture partitioning element of claim 1, wherein at least two of the plurality of segments of the aperture partitioning element are phased together to effectively act as a single sub aperture.

* * * * *